Nov. 7, 1944. L. C. SMITH 2,362,104
BEVERAGE DISPENSING APPARATUS
Filed May 13, 1942
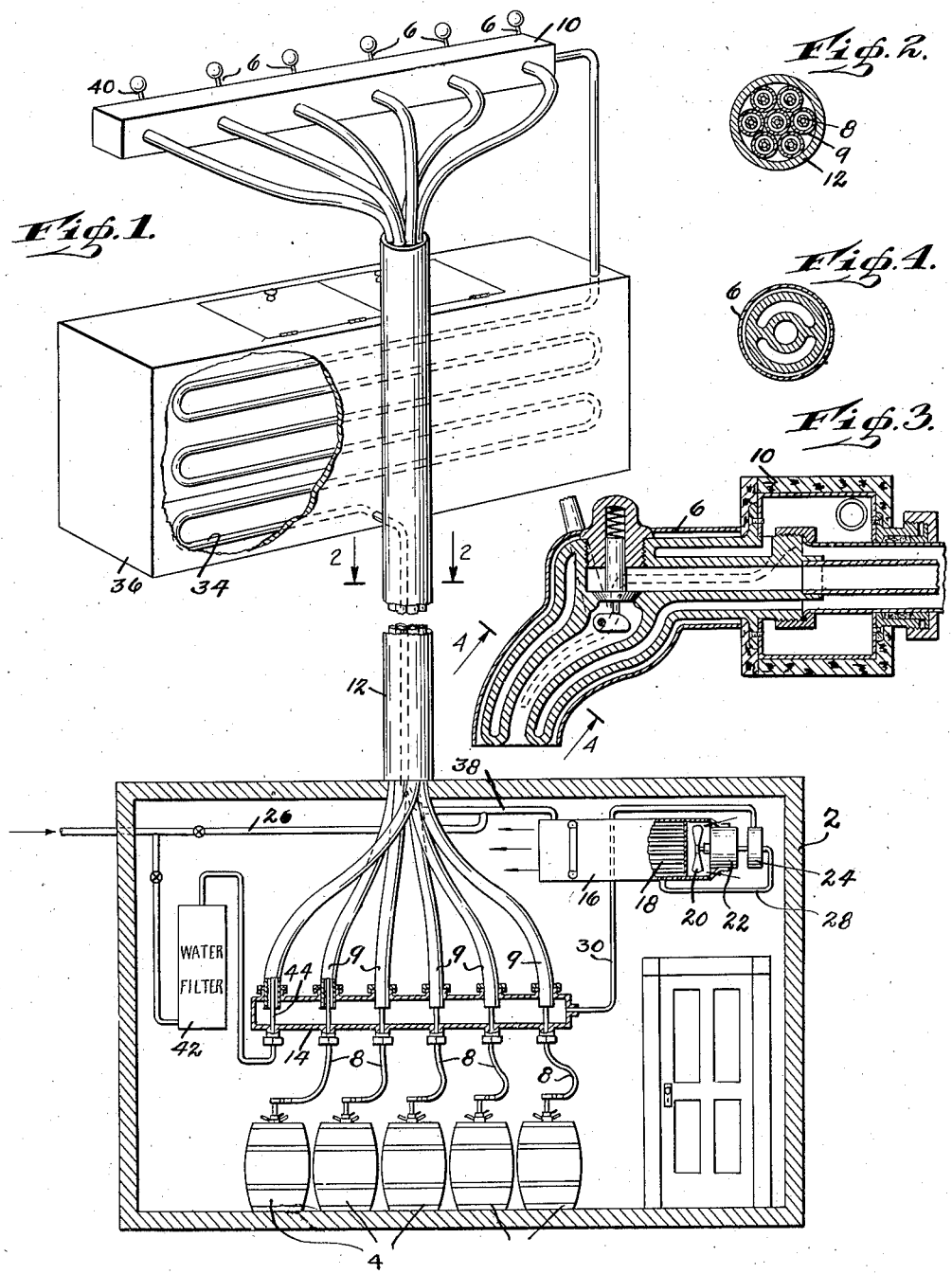
INVENTOR
LEONARD C. SMITH
BY
James G. Bethell
ATTORNEY Patented Nov. 7, 1944

2,362,104

UNITED STATES PATENT OFFICE 2,362,104

BEVERAGE DISPENSING APPARATUS

Leonard C. Smith, New York, N. Y.

Application May 13, 1942, Serial No. 442,743

2 Claims. (Cl. 225—40)

This invention relates to apparatus for dispensing beverages and is directed more specifically to apparatus which is relatively simple and inexpensive in construction for the dispensing of beverages wherein the beverage will be delivered at the outlet of the apparatus, as at a faucet, for example, in a cooled condition.

Still more specifically the present invention is directed to apparatus for dispensing beverages wherein the beverage may be conducted for some distance from a central source of supply to the faucet at which the beverage is to be dispensed to the consumer, my improved apparatus providing for cooling the beverage from this central point of supply to the point of delivery, whereby at the point of discharge the beverage will be in as cool a condition as when it left the source of supply.

In the drawing I have illustrated an embodiment of my invention:

Fig. 1 is more or less a diagrammatic view in part sectional elevation of the entire equipment;

Fig. 2 is a section on the line 2—2 of Fig. 1;

Fig. 3 is a detail of one of the faucets at which the beverage being dispensed is delivered; and Fig. 4 is a section on the line 4—4 of Fig. 3.

Referring to the drawing in detail: 2 designates a chamber which may be located, for example, in the cellar or basement of a building. Within this chamber I store one or more cooled containers 4 of the beverage to be dispensed, the beverage being drawn from any one of these containers and dispensed at the desired faucet 6. As above pointed out, it is an object of my invention to deliver the beverage at the faucets 6 in as cool a condition as when it left the supply source. Obviously that part or portion of the beverage contained within the tubes leading from the main containers 4 to the faucets 6 will be at room temperature unless means are provided for cooling the beverage in this area. Accordingly I provide tubes designated 8 leading from each container 4 upwardly into a header 10 to the faucets 6, the beverage from the various containers 4 being conducted through these tubes. Loosely surrounding each tube 8 is a cooling or insulating conduit 9 and surrounding the whole assembly is a pipe 12.

Within the chamber 2 just above the containers 4 is a header 14. The tubes 8 pass through this header and the lower ends of the conduits 9 extend into this header, as illustrated in Fig. 1.

Also located within the chamber 2 is a cooling machine 16. This cooling machine in the form illustrated comprises a shell containing a series of open ended tubes 18. Air is passed through these open-ended tubes 18 by a fan 20 driven by a motor 22 mounted on one end of the shell of the cooling machine. This motor 22 also drives a pump 24 for the circulation of the cooling fluid. In the present embodiment of my invention I employ water as a coolant. This water is taken from any suitable supply source, passing to the shell of the cooling machine through valve controlled line 26. The pump 24 draws this water out of the cooling machine shell by way of conduit 28 and pumps it by way of conduit 30 into the header 14. The water passes out of this header upwardly through the conduits 9 along the exterior of the several tubes 8 leading from the containers 4. The water passing upwardly through the conduits 8 enter the header 10 and after circulating about the faucets 6 passes out of the header 10 and through cooling coils 34 contained in a box 36 just below the header 10, which box may be kept filled with ice, for instance, and back to the shell of the cooling machine 16 by way of conduit 38. One of the faucets, for example, the faucet 40, may be for dispensing water and in this connection a water filter 42 is provided in the chamber 2 connected to the main source of water supply, the discharge side of this filter passing through the header 14 and then upwardly through the tubing 44 to the faucet 40.

It will be seen from all of the foregoing that my invention provides an apparatus for dispensing beverages wherein the pipes or tubes through which the beverage is conducted to the faucets are water insulated, and that the faucets themselves are water jacketed, so that regardless of the distance from the beverage supply to the point of discharge, the beverage will be kept cooled, and that regardless of the time elapsing between operations of the faucets, a cool beverage will always be dispensed.

It is to be understood that changes may be made in the details of construction and arrangement of parts herein shown and described within the purview of my invention.

What I claim is:

1. In apparatus for dispensing beverages, the combination of a cooling chamber, containers of cooled beverage therein, a dispensing point or station including a faucet for each container remote from the containers, a beverage tube extending from each of the said containers to the said faucets, a closed cooling conduit system independently surrounding each of said tubes and faucets, a cooling machine in said chamber, and a pump for circulating water through said cooling machine and conduits, about said faucets and back through the cooling machine.

2. In beverage dispensing apparatus, the combination of a cooling chamber, containers of cooled beverage therein, a dispensing station including a faucet outside said chamber for each of said containers, a tube connecting each container to its faucet, a water jacket for each faucet, a closed conduit system individually surrounding each of the tubes, and in communication with said water jacket, a cooling machine in said cooling chamber including an air cooled shell, a water return line from the water jacket of each faucet to the shell of the said cooling machine, and a pump for circulating water from the cooling machine through said closed conduit systems and faucet water jackets and back through the said cooling machine shell for recirculation, whereby the temperature of the beverage dispensed at the faucet will be substantially that of the beverage in the container.

LEONARD C. SMITH.